United States Patent
Matthieu et al.

[15] 3,698,440
[45] Oct. 17, 1972

[54] THERMALLY INSULATED CONDUIT

[72] Inventors: Paul Matthieu, Berlin; Ottmar Leuchs, Hannover; Fritz Glander, Isernhagen NB; Hubert Kuypers, Bad Nenndorf; Diethart Pelz, Langenhagen, all of Germany

[73] Assignee: Kabel-und Metallwerke Gutehoffnungshutte Aktiengesellschaft, Hannover, Germany

[22] Filed: April 20, 1971

[21] Appl. No.: 135,585

[30] Foreign Application Priority Data

April 21, 1970 Germany..........P 20 19 081.2

[52] U.S. Cl. ....................138/149, 138/26, 138/114, 138/122, 181/36 B, 181/47 A, 252/62, 161/139

[51] Int. Cl...........F16l 9/14, F16l 59/02, F16l 55/04

[58] Field of Search.........138/26, 149, 114, 121–122; 252/62; 161/139; 181/47 A, 36 B

[56] References Cited

UNITED STATES PATENTS 3,473,575  10/1969  Vogelsang.................138/149
3,561,492  2/1971  Kauder......................138/121

FOREIGN PATENTS OR APPLICATIONS 769,993  3/1957  Great Britain..........181/47 A Primary Examiner—Herbert F. Ross
Attorney—Phillip G. Hilbert

[57] ABSTRACT

Thermally insulated conduit of indefinite length for transporting liquid or gaseous material in a heated or cooled state; the conduit including an oscillation damping layer.

7 Claims, 2 Drawing Figures

PATENTED OCT 17 1972 3,698,440

INVENTORS
Paul Matthieu
Ottmar Leuchs
Fritz Glander
Hubert Kuypers
Diethart Pelz BY *Philip G. Hilbert*
ATTORNEY

THERMALLY INSULATED CONDUIT

The instant invention relates to thermally insulated conduit which is used to transport liquid or gaseous materials in a heated or cooled condition. Such conduit consists of at least two corrugated concentric tubings.

Such conduits are particularly used for long distance heating and usually include a heat insulating layer such as polyurethane foam disposed between inner and outer tubings. Such conduit can be made in long lengths and lends itself to shipment wound on drums in a manner similar to that used for electrical cables.

However, a disadvantage resides in known conduit constructions wherein the tubings are corrugated to increase flexibility thereof. Thus, with very long lengths of conduit and at certain rates of flow of the media passing through the inner tubing; such inner tubing is stimulated and swings in its longitudinal axis because of the corrugations thereof.

Accordingly, an object of this invention is to provide a thermally insulated conduit comprising a pair of concentric corrugated tubings, together with a layer of oscillation damping material therebetween.

Another object of this invention is to provide an improved conduit of the character described, which further includes a layer of heat insulating material.

Yet another object of this invention is to provide a conduit of the character described, wherein the oscillation damping layer also has heat insulating characteristics.

Other objects of this invention will in part be obvious and in part hereinafter pointed out.

DESCRIPTION OF THE PREFERRED EMBODIMENTS

Figure 1:
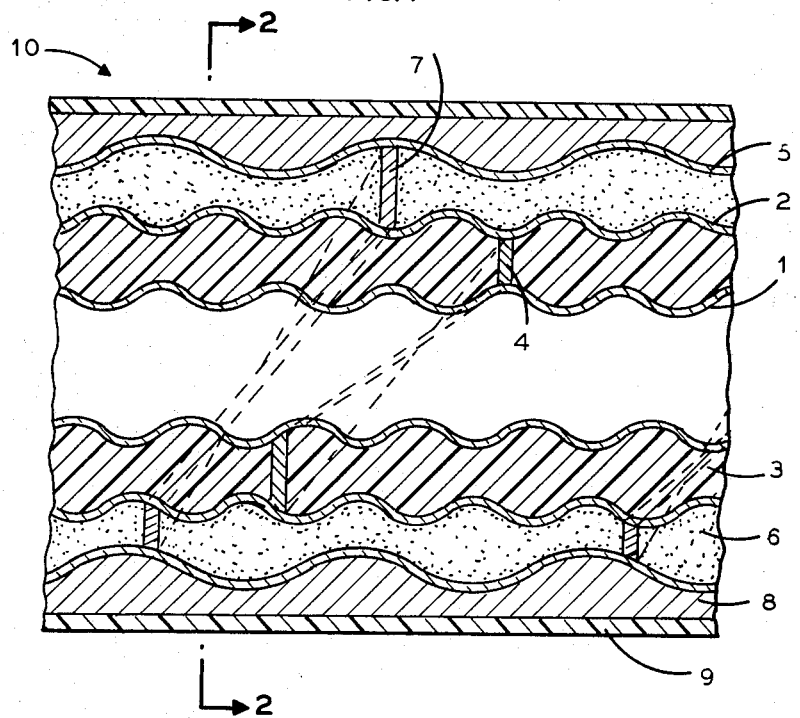
FIG. 1 is a longitudinal sectional view of a thermally insulated conduit embodying the invention.
Figure 2:
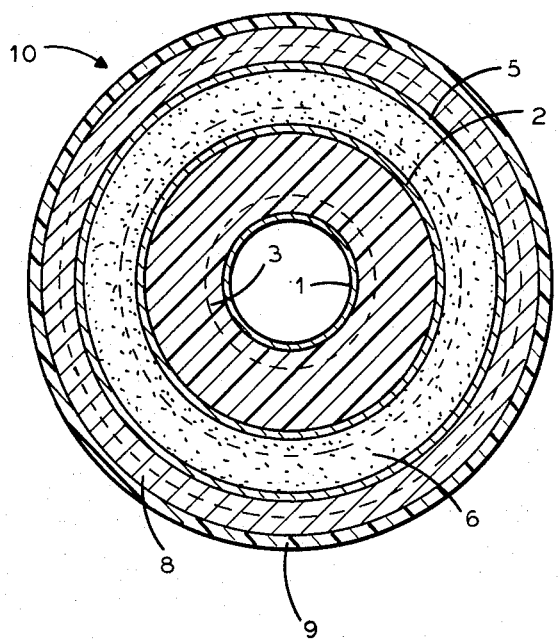
FIG. 2 is a transverse sectional view thereof

As shown in the drawing, 10 designates a thermally insulated conduit embodying the invention. The same comprises an inner tubing 1 which may be formed of copper or other suitable material including synthetic resin foil. The tubing 1 is transversely corrugated.

Disposed about tubing 1 is a tubing 2 concentrically related thereto and which may be formed of steel and derived from a metal tape converted to a tubular form about inner tubing 1, with a longitudinal slit therein to provide a longitudinal seam which is thereafter welded in a known manner. A layer 3 of oscillation damping material is introduced between tubings 1 and 2, by way of the slit portion in tubing 2. The tubings 1 and 2 are held in spaced relation by a helical supporting strip 4 of plastic or other suitable material.

The damping material 3 is of a thixotropic nature and may suitably consist of a hydrous dispersion of polyvinyl acetate which is filled with vermiculite flake or particles. The material 3 may be further loaded with powdered barium sulfate.

Further, conduit 10 may include an outer sheath 5 which is formed of steel from a tape folded about tubing 2 and longitudinally seamed in a known manner, as by welding or the like. Disposed between sheath 5 and tubing 2 is a layer of heat insulating material 6 such as hard polyurethane foam. Spacer means 7 is also provided between tubing 2 and sheath 5, in the form of a helical strip of plastic or the like, which is introduced by way of the slit portion of sheath 5 as the same is formed.

On the outer surface of sheath 5 there is disposed a corrosion inhibiting layer 8 followed by an extruded jacket 9 of polyvinyl chloride or other suitable resin.

It has been found that the Thixotropic material 3 increases its plasticity when the conduit is subject to sudden deformation as incipient oscillations, and thus is effective to dampen such oscillations. Also, the layer 3 along the length thereof may comprise alternating sections of hard and soft material, which also acts as a damping means to break up any oscillation system.

It is understood that a single layer of material may be used in the conduit which exhibits both oscillation damping characteristics and is also a thermal insulator.

We claim:

1. A thermally insulated conduit for transporting liquids or gases in a heated or cooled state, said conduit comprising a pair of concentric, transversely corrugated tubings providing an annular space therebetween and a layer of oscillation damping, thixotropic material in said space and in contact with the innermost of said tubings.

2. A thermally insulated conduit as in claim 1 and further including a layer of heat insulating material disposed outwardly of said thixotropic material.

3. A conduit as in claim 1 wherein said tubings are formed of metal.

4. A conduit as in claim 1 wherein at least one of said tubings is formed of synthetic resin.

5. A conduit as in claim 1 wherein said thixotropic material comprises successive longitudinal sections of alternating hardness and softness.

6. A conduit as in claim 1 wherein said thixotropic material comprises a hydrous dispersion of polyvinyl acetate filled with vermiculite.

7. A conduit as in claim 6, and further including a filler of powdered barium sulfate in said dispersion.

* * * * *